United States Patent
Inokawa et al.

(10) Patent No.: US 9,931,623 B2
(45) Date of Patent: Apr. 3, 2018

(54) METHOD FOR PRODUCING METAL NANOPARTICLE COMPLEX, AND METAL NANOPARTICLE COMPLEX PRODUCED BY SAID METHOD

(71) Applicant: HIROSHIMA UNIVERSITY, Hiroshima (JP)

(72) Inventors: Hitoshi Inokawa, Hiroshima (JP); Hiroki Miyaoka, Hiroshima (JP); Yoshitsugu Kojima, Hiroshima (JP); Takayuki Ichikawa, Hiroshima (JP); Michihiro Miyake, Okayama (JP); Yoshikazu Kameshima, Okayama (JP); Shunsuke Nishimoto, Okayama (JP)

(73) Assignee: HIROSHIMA UNIVERSITY, Hiroshima (JP)

( * ) Notice: Subject to any disclaimer, the term of this patent is extended or adjusted under 35 U.S.C. 154(b) by 252 days.

(21) Appl. No.: 14/646,349

(22) PCT Filed: Nov. 1, 2013

(86) PCT No.: PCT/JP2013/006491
§ 371 (c)(1),
(2) Date: May 20, 2015

(87) PCT Pub. No.: WO2014/083772
PCT Pub. Date: Jun. 5, 2014

(65) Prior Publication Data
US 2015/0290635 A1 Oct. 15, 2015

(30) Foreign Application Priority Data

Nov. 30, 2012 (JP) .................................. 2012-263374

(51) Int. Cl.
*B01J 29/06* (2006.01)
*B01J 37/34* (2006.01)
(Continued)

(52) U.S. Cl.
CPC ........... *B01J 37/345* (2013.01); *B01J 29/061* (2013.01); *B01J 29/068* (2013.01); *B01J 29/072* (2013.01); *B01J 29/076* (2013.01); *B01J 29/087* (2013.01); *B01J 29/088* (2013.01); *B01J 29/103* (2013.01); *B01J 29/106* (2013.01); *B01J 29/123* (2013.01); *B01J 29/126* (2013.01); *B01J 29/143* (2013.01); *B01J 29/146* (2013.01); *B01J 29/163* (2013.01); *B01J 29/166* (2013.01); *B01J 29/185* (2013.01); *B01J 29/20* (2013.01); *B01J 29/22* (2013.01); *B01J 29/24* (2013.01); *B01J 29/26* (2013.01); *B01J 29/40* (2013.01); *B01J 29/405* (2013.01);
(Continued)

(58) Field of Classification Search
CPC ...... B01J 29/061; B01J 29/068; B01J 29/072; B01J 29/103; B01J 29/106; B01J 29/123; B01J 29/126; B01J 29/143; B01J 29/146; B01J 29/076; B01J 29/087; B01J 29/088; B01J 29/163; B01J 29/166; B01J 29/185; B01J 29/20; B01J 29/22; B01J 29/24; B01J 29/26; B01J 29/40; B01J 29/44; B01J 29/46; B01J 29/405; B01J 29/48; B01J 29/7207; B01J 29/7215; B01J 29/7407; B01J 29/7415; B01J 29/7607; B01J 29/7615; B01J 29/7053; B01J 29/7057; B01J 29/7807; B01J 29/7815; B01J 2229/34; B01J 2229/186; B01J 35/006; B01J 35/1057; B01J 35/1061; B01J 35/0006; B01J 37/02; B01J 37/03; B01J 37/086; B01J 37/16; B01J 37/18; B01J 37/34; B01J 37/0238; B01J 37/345
USPC ........................... 502/60, 74, 75, 77, 78, 79
See application file for complete search history.

(56) References Cited

U.S. PATENT DOCUMENTS 5,849,652 A * 12/1998 Davies ................... B01J 23/00
502/60
9,192,919 B2 * 11/2015 Hock .................... C07C 5/3332
(Continued)

FOREIGN PATENT DOCUMENTS

JP  2008-212872 A  9/2008
JP  2009-046372 A  3/2009
(Continued)

OTHER PUBLICATIONS

Bein, T., et al., "Photolytic and Thermolytic Decomposition Products from Iron Pentacarbonyl Adsorbed on Y Zeolite", *Zeolites*, Jul. 1985, pp. 240-244, vol. 5, Butterworth & Co. Ltd., U.K.
(Continued)

*Primary Examiner* — Elizabeth D Wood
(74) *Attorney, Agent, or Firm* — Alston & Bird LLP

(57) ABSTRACT

A method for producing a metal nanoparticle complex according to the present invention is a method for producing a metal nanoparticle complex in which metal nanoparticles are supported in pores of a porous body, said method comprising at least: an adsorption step of allowing an organic metal complex to adsorb in pores of a porous body; and a decomposition/reduction step of heating the porous body, which has had the organic metal complex adsorbed in the pores thereof, under a reductive atmosphere to decompose an organic compound in the organic metal complex adsorbed in the pores of the porous body and also reduce a metal cation in the organic metal complex, thereby causing metal nanoparticles to be supported in the pores of the porous body.

6 Claims, 12 Drawing Sheets

(51) Int. Cl.
| | |
|---|---|
| B01J 29/072 | (2006.01) |
| B01J 29/068 | (2006.01) |
| B01J 29/10 | (2006.01) |
| B01J 29/12 | (2006.01) |
| B01J 29/14 | (2006.01) |
| B01J 29/08 | (2006.01) |
| B01J 29/076 | (2006.01) |
| B01J 29/16 | (2006.01) |
| B01J 29/22 | (2006.01) |
| B01J 29/20 | (2006.01) |
| B01J 29/18 | (2006.01) |
| B01J 29/46 | (2006.01) |
| B01J 29/44 | (2006.01) |
| B01J 29/24 | (2006.01) |
| B01J 29/40 | (2006.01) |
| B01J 29/26 | (2006.01) |
| B01J 29/76 | (2006.01) |
| B01J 29/48 | (2006.01) |
| B01J 29/74 | (2006.01) |
| B01J 29/72 | (2006.01) |
| B01J 29/78 | (2006.01) |
| B01J 29/70 | (2006.01) |
| B01J 35/00 | (2006.01) |
| B01J 31/22 | (2006.01) |
| B01J 35/02 | (2006.01) |
| B01J 35/10 | (2006.01) |
| B01J 37/08 | (2006.01) |
| B01J 37/18 | (2006.01) |
| B01J 37/03 | (2006.01) |
| B01J 37/02 | (2006.01) |
| B01J 37/16 | (2006.01) |

(52) U.S. Cl.
CPC .............. *B01J 29/44* (2013.01); *B01J 29/46* (2013.01); *B01J 29/48* (2013.01); *B01J 29/7053* (2013.01); *B01J 29/7057* (2013.01); *B01J 29/7207* (2013.01); *B01J 29/7215* (2013.01); *B01J 29/7407* (2013.01); *B01J 29/7415* (2013.01); *B01J 29/7607* (2013.01); *B01J 29/7615* (2013.01); *B01J 29/7807* (2013.01); *B01J 29/7815* (2013.01); *B01J 31/2295* (2013.01); *B01J 35/006* (2013.01); *B01J 35/0006* (2013.01); *B01J 35/0013* (2013.01); *B01J 35/023* (2013.01); *B01J 35/1057* (2013.01); *B01J 35/1061* (2013.01); *B01J 37/08* (2013.01); *B01J 37/18* (2013.01); *B01J 35/1019* (2013.01); *B01J 35/1023* (2013.01); *B01J 35/1038* (2013.01); *B01J 37/02* (2013.01); *B01J 37/0238* (2013.01); *B01J 37/03* (2013.01); *B01J 37/086* (2013.01); *B01J 37/16* (2013.01); *B01J 37/34* (2013.01); *B01J 2229/186* (2013.01); *B01J 2229/34* (2013.01)

(56) References Cited

U.S. PATENT DOCUMENTS

| | | | | |
|---|---|---|---|---|
| 2009/0078913 | A1* | 3/2009 | Luque | B01J 20/20 252/500 |
| 2009/0221418 | A1* | 9/2009 | Fischer | B01J 23/44 502/155 |
| 2010/0076208 | A1* | 3/2010 | Dhingra | B01J 23/52 549/533 |
| 2012/0097595 | A1 | 4/2012 | Tokoshima et al. | |

FOREIGN PATENT DOCUMENTS

| | | |
|---|---|---|
| JP | 2010-240557 A | 10/2010 |
| JP | 2010-240641 A | 10/2010 |

OTHER PUBLICATIONS

Molina, R., et al., α-Alumina-Supported Nickel Catalysts Prepared with Nickel Acetylacetonate. 2. A Study of the Thermolysis of the Metal Precursor, *J. Phys. Chem. B*, Dec. 4, 1999, pp. 11290-11296, vol. 103, No. 51, American Chemical Society, U.S.

Molina, R. et al., "α-Alumina-Supported Nickel Catalysts Prepared from Nickel Acetylacetonate: A TPR Study", *Journal of Catalysis*, Jan. 25, 1998, vol. 173, No. 2, pp. 257-267, Academic Press, U.S.

Stievano, L., et al., "Synthesis and Characterisation of Highly Dispersed Ni/SiO$_2$ Catalysts Prepared by Gas-Phase Impregnation/Decomposition (GPI/D) of a Ni(II) β-Diketonate Precursor Complex", *Catalysis Letters*, Apr. 2005, pp. 169-176, vol. 100, Nos. 3-4, Butterworth & Co. Ltd., U.K.

Nijs, H., et al, "Selective Fischer-Tropsch Synthesis of Hydrocarbons: Particle Size Effect of Ruthenium Metal in Faujasite-Type Zeolites", *Journal of the Chemical Society, Chemical Communications*, 1979, Royal Society of Chemistry, UK.

International Searching Authority, International Search Report (ISR) and Written Opinion for International Application No. PCT/JP2013/006491, dated Jan. 28, 2014, 9 pages, Japanese Patent Office, Japan.

International Preliminary Examining Authority, International Preliminary Report on Patentability for International Application No. PCT/JP2013/006491, dated Mar. 17, 2015, 13 pages, Japanese Patent Office, Japan.

\* cited by examiner 50 nm 50 nm

METHOD FOR PRODUCING METAL NANOPARTICLE COMPLEX, AND METAL NANOPARTICLE COMPLEX PRODUCED BY SAID METHOD

CROSS REFERENCE TO RELATED APPLICATIONS

This application is a national stage application, filed under 35 U.S.C. § 371, of International Application No. PCT/JP2013/006491, filed Nov. 1, 2013, which claims priority to Japanese Application No. 2012-263374, filed Nov. 30, 2012, the contents of all of which as are hereby incorporated by reference in their entirety.

BACKGROUND

Technical Field

The present invention relates to a method for producing a metallic nanoparticle composite in which metallic nanoparticles are dispersed and which is usable as catalyst, for example, and also relates to a metallic nanoparticle composite produced by such a method.

Description of Related Art

An impregnation method has been used in the known art as a method for dispersing metallic nanoparticles (such as nickel nanoparticles) of a nanometer scale (e.g., having a mean particle size of 1 to 5 nm) in a porous medium (such as zeolite, mesoporous silica or activated charcoal) with microscopic pores (with a mean pore size of 2 nm or less) or mesoscopic pores (with a mean pore size of 2 to 50 nm).

According to the impregnation method, a porous medium (support) is added to an aqueous solution including a metallic element, and its water is vaporized by heating, for example, thereby loading a compound including the metallic element on the porous medium. After that, the porous medium is heated in a reducing atmosphere to reduce the loaded compound into metal.

In this case, if the metallic nanoparticles that have been loaded by the impregnation method are heated to an elevated temperature (of 300 to 400° C., for example), then those metallic nanoparticles will move and adhere and aggregate together, thus causing aggregation and sintering phenomena. As a result, those metallic nanoparticles will grow excessively. In that case, a metallic nanoparticle composite in which such excessively grown metallic nanoparticles are dispersed has such a decreased surface area exhibiting catalytic activity that the overall catalytic activity of the complex decreases, which is a problem.

Thus, to overcome such a problem, some people proposed a method of making metallic nanoparticles inside the pores of a porous medium. For example, a method of making ruthenium nanoparticles (with a mean particle size of 4 nm) inside pores of a zeolite by reducing an Ru(NH3)62+ complex introduced into the zeolite pores through ion exchange has been disclosed (see, for example, Hubert H. Nijs, Peter A. Jacobs, Jan B. Uytterhoeven, J. C. S. Chem. Comm., 1979, 1095.

Also, a method for reducing nickel ions into nickel particles (with a mean particle size of 5 nm or less) inside pores of a zeolite by making ammonium ions and nickel ions coexist as cations and by utilizing the reduction power of ammonia that desorbs itself through heat treatment has been disclosed (see, for example, Japanese Unexamined Patent Publication No. 2009-46372.

However, the method disclosed in Non-Patent Document 1 is applicable to only noble metals such as platinum and ruthenium, not to cobalt, nickel or any other base metal with high catalytic activity. The reason is that although a noble metal such as platinum or ruthenium has lower ionization tendency than hydrogen and is easily reducible, a base metal such as cobalt or nickel has higher ionization tendency than hydrogen, and therefore, is more difficult to reduce from cation sites and thus requires a lot of energy.

On the other hand, according to the method disclosed in Patent Document 1, the zeolite exhibits outstanding solid acid sites due to generation of hydrogen ions during decomposition of ammonium ions into ammonia. As a result, there will be the catalytic properties of both nickel and those acid sites there to cause a decrease in reaction selectivity and limit its use as a catalyst.

BRIEF SUMMARY

Thus, the present inventors perfected our invention to overcome these problems with the related art by providing a method for producing a metallic nanoparticle composite which is applicable to even a metal such as cobalt or nickel with high catalytic activity and which has broad applicability as a catalyst and also providing a metallic nanoparticle composite produced by such a method.

To achieve this object, a method for producing a metallic nanoparticle composite according to the present invention includes at least: an adsorbing step to cause an organometallic complex to be adsorbed into pores of a porous medium; and a decomposing and reducing step to decompose an organic compound of the organometallic complex that has been adsorbed into the pores of the porous medium by subjecting the porous medium, which has adsorbed the organometallic complex in its pores, to a heating treatment within a reducing atmosphere, and to reduce metal cations in the organometallic complex to load the metallic nanoparticles into the pores of the porous medium.

According to the present invention, by preventing metallic nanoparticles from growing excessively, a decrease in the catalytic activity of the metallic nanoparticles can be suppressed and a metallic nanoparticle composite which can be used as a catalyst in a broad range of applications can be provided. In addition, a metallic nanoparticle composite with excellent reaction selectivity can be provided, too.

DETAILED DESCRIPTION OF VARIOUS EMBODIMENTS

Figure 1:
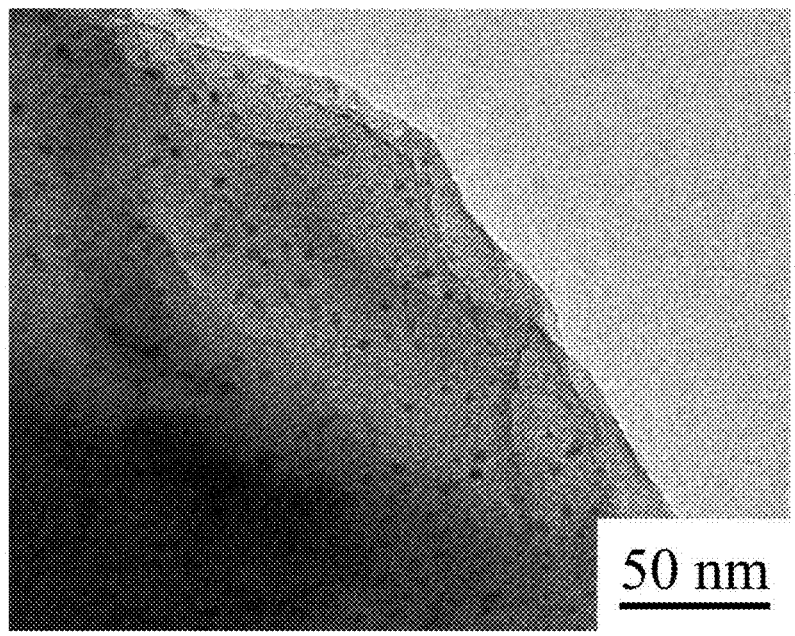
FIG. 1 An electron micrograph (TEM micrograph) of a metallic nanoparticle composite according to EXAMPLE 1.

Embodiments of the present invention will now be described with reference to the accompanying drawings. Note that the following description of embodiments is not intended to limit the scope of the present invention.

A method for producing a metallic nanoparticle composite according to the present invention is designed to produce a metallic nanoparticle composite in which metallic nanoparticles of a nanometer scale (with a mean particle size of 1 to 5 nm) are dispersed by causing an electrically neutral organometallic complex to be adsorbed into pores of a porous medium and by decomposing the organometallic complex molecules inside the pores.

The metallic nanoparticles produced by the method of the present invention have a substantially spherical shape, and have a mean particle size of 1 to 5 nm. Also, the metallic nanoparticles produced by the method of the present invention may also be used as a reforming catalyst to generate hydrogen from a hydrocarbon such as alcohol or methane, an ammonia synthesis catalyst or a catalyst to purify an automobile exhaust gas.

Note that the "mean particle size" is herein obtained according to the present invention by measuring the particle sizes of approximately 10 to 50 metallic nanoparticles, and calculating their average, on a micrograph of the metallic nanoparticles produced.

The constituent metal of the metallic nanoparticles is not particularly limited but may be any of noble metals such as gold, silver, platinum, palladium, rhodium, iridium, ruthenium, and osmium or any of various base metals with high catalytic activity, examples of which include scandium, titanium, vanadium, chromium, manganese, iron, cobalt, nickel, copper and zinc. Alternatively, even an alkaline metal element such as lithium, sodium or potassium or an alkaline earth metal element such as magnesium may also be used. Any of these various metals may be used either by itself or in combination. In the latter case, two or more of these metals may be dispersed in a porous medium, and loaded into its pores, depending on the intended application of the metallic nanoparticles.

The porous medium for use in the method of the present invention is preferably at least one selected from the group consisting of zeolite, porous silica, porous alumina, porous alumino-silicate, porous carbons such as activated charcoal and carbon nanotubes, and MOF (metal-organic framework). Among other things, a zeolite is particularly preferred, because a zeolite has microscopic pores with high thermal resistance and three-dimensionally regularity.

As this zeolite, a Type A zeolite, a Type MFI zeolite, a Type X zeolite, a Type Y zeolite, a Type β zeolite, or a mordenite may be used. Among other things, a Type X or Type Y zeolite is particularly preferred, because the zeolite has pores which have a large size and which are three-dimensionally connected together.

Also, the pores of the porous medium preferably have a mean (pore) size of 5 nm or less.

The reason is that if the pores had a mean pore size of greater than 5 nm, the metallic nanoparticles loaded into those pores would sometimes diffuse and aggregate together too easily to avoid a decrease in the degree of stability (or chemical fixation) of the metallic nanoparticles. Note that if the mean pore size of the pores were smaller than the particle size of the organometallic complex, then the organometallic complex that is the precursor of the metallic nanoparticles could not be introduced into the pores in some cases. Thus, to avoid this inconvenience, the mean pore size of the pores needs to be larger than the particle size of the organometallic complex.

Figure 8:
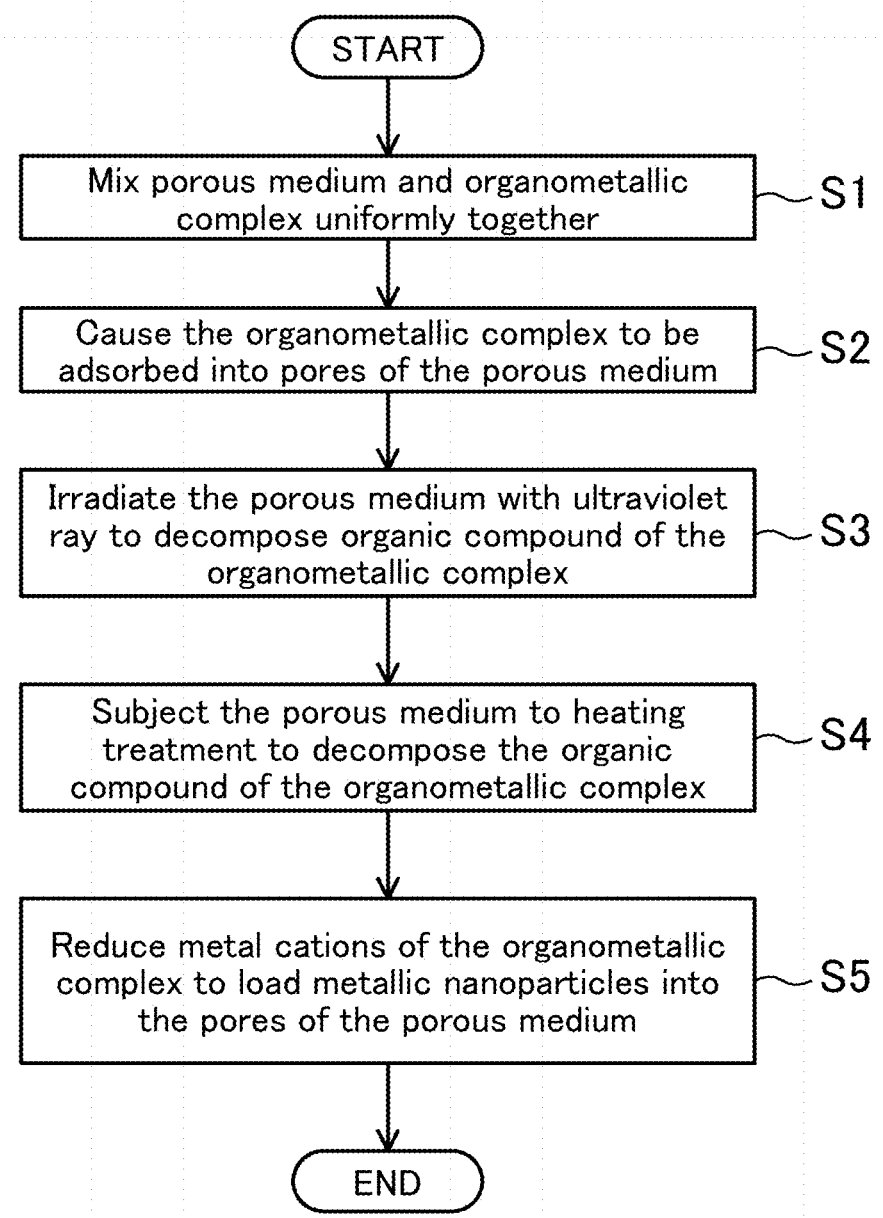
FIG. 8 A flowchart showing the procedure for producing a metallic nanoparticle composite according to an embodiment of the present invention.

Next, it will be described how to produce a metallic nanoparticle composite according to an embodiment of the present invention. FIG. 8 is a flowchart showing a procedure in which the metallic nanoparticle composite is produced according to an embodiment of the present invention. In this embodiment, an electrically neutral organometallic complex is adsorbed into the pores of a porous medium and has its molecules decomposed inside the pores, thereby producing a metallic nanoparticle composite in which metallic nanoparticles of a nanometer scale (with a mean particle size of 1 to 5 nm) are dispersed.

<Step of Making Mixture>

First of all, the porous medium described above is heated to vaporize the water that has been adsorbed to itself, and then the porous medium and the organometallic complex are mixed uniformly together (in Step S1).

In this case, a substance that produces a vapor of the organometallic complex either at room temperature or under heat is used as the organometallic complex. For example, metallocene or carbonyl complex with sublimability may be used.

More specifically, if nickel is used as the constituent metal of the metallic nanoparticles, for example, an organic nickel complex such as nickelocene ($Ni(C_5H_5)_2$) may be used.

Also, the volume of the organometallic complex to be added in this process step is determined by the pore volume of the porous medium and the volume of the pores occupied by the organometallic complex that has been adsorbed into the pores. Specifically, in this embodiment, the volume of the pores occupied by the organometallic complex is preferably 1 to 100 parts by volume relative to 100 parts by volume of the pore volume of the porous medium. The reason is that if the volume of the pores occupied by the organometallic complex were greater than 100 parts by volume, then the organometallic complex would be adsorbed onto the external surface of the porous medium, thus allowing excessively grown particles to be formed on the external surface of the porous medium as a result. However, if the volume of the pores occupied by the organometallic complex were less than 1 part by volume of the overall volume of the pores, then the number of active points of the catalyst would be too small to achieve sufficient catalytic effects. This volume range is preferred to avoid these inconveniences.

<Adsorbing Step>

Next, the mixture of the porous medium and the organometallic complex was put into a reaction vessel such as a test tube. The reaction vessel had its internal pressure lowered to a predetermined pressure and then was sealed airtight. After that, the mixture was kept heated to a predetermined temperature for a predefined amount of time, thereby vaporizing (e.g., sublimating) the organometallic complex and causing the organometallic complex to be adsorbed into pores of the porous medium (in Step S2).

In this case, the process time (adsorption time) of this process step preferably falls within the range of 1 to 24 hours. The reason is that if the process time were less than one hour, it would be sometimes difficult to cause the organometallic complex to diffuse uniformly over the entire pores of the porous medium. However, if the process time were longer than 24 hours, then the organometallic complex would have already diffused uniformly over the entire pores of the porous medium and the productivity (time efficiency) would decline. That is to say, by setting the process time of this process step to be within the range of 1 to 24 hours, the organometallic complex can be made to diffuse uniformly over the entire pores of the porous medium without causing a decrease in productivity.

Note that the process temperature of this process step may be set appropriately according to the vaporization (sublimation) temperature of the organometallic complex used.

<Decomposing Step>

Next, the organic compound (i.e., a ligand that is an organic component) of the organometallic complex that has been adsorbed into the pores of the porous medium is decomposed, thereby fixing the metal ions of the organometallic complex into the pores of the porous medium. More specifically, the porous medium, which has adsorbed the organometallic complex in its pores, may be irradiated with an ultraviolet ray for a predetermined amount of time, thereby decomposing the organic compound of the organometallic complex (in Step S3).

Note that since the organic compound will be decomposed completely in the step of decomposing and reducing to be described later, this is not an indispensable process step for producing metallic nanoparticles. Nevertheless, by performing this process step, more homogeneous metallic nanoparticles that are dispersed more uniformly can be obtained. Particularly when an organometallic complex which is easily vaporizable under heat (e.g., which has sublimability) is used, then the organometallic complex may desorb itself from the pores and form excessively grown particles outside of the pores in the step of decomposing and reducing to be described later. For that reason, to obtain more homogeneous metallic nanoparticles that are dispersed more uniformly, it is important to decompose the organic compound of the organometallic complex and fix the organic compound inside the pores of the zeolite (i.e., eliminate its sublimability) by performing this decomposing step.

As an ultraviolet light source, a xenon lamp, a high-pressure mercury lamp, a low-pressure mercury lamp or a metal halide lamp may be used, for example.

The illuminance of the ultraviolet ray is suitably set to fall within the range of 1 to 1000 mW/cm2 at a wavelength of 360 nm. The reason is that if the illuminance of the ultraviolet ray were less than 1 mW/cm2, then it would be sometimes difficult to decompose the organic compound of the organometallic complex sufficiently. However, if the illuminance of the ultraviolet ray were greater than 1000 mW/cm2, then the productivity (i.e., energy efficiency) would sometimes decrease. That is why this illuminance range is preferred to avoid these inconveniences.

Furthermore, the ultraviolet ray needs to be radiated for a varying amount of time according to the amount of the sample, the content of the organometallic complex, and the intensity of the ultraviolet ray, for example. The role to be played by the ultraviolet ray irradiation is to decompose the organic compound of the organometallic complex that has been adsorbed into the pores of the porous medium and to fix the metal ions of the organometallic complex into the pores of the porous medium. For that reason, the entire sample needs to be irradiated with a sufficient quantity of ultraviolet ray. Depending on the shape of the sample vessel or the state of the sample, the sample may need to be stirred up uniformly while being irradiated with an ultraviolet ray. If the sample gets discolored by being irradiated with an ultraviolet ray, then the sample needs to be irradiated with an ultraviolet ray continuously until the entire sample changes its color completely.

<Decomposing and Reducing Step>

Next, the porous medium, which has adsorbed the organometallic complex in its pores, is subjected to a heating treatment at a predetermined temperature for a predefined amount of time within a reducing atmosphere (e.g., within a hydrogen atmosphere), thereby decomposing the organic compound of the organometallic complex that has been adsorbed into the pores of the porous medium (in Step S4). Meanwhile, the metal cations of the organometallic complex are reduced to produce a metallic nanoparticle composite in which the metallic nanoparticles are loaded into the pores of the porous medium (in Step S5).

Note that in this process step, the organic compound of the organometallic complex that has not been decomposed, but left in some pores of the porous medium, in the organometallic complex decomposing step described above is also decomposed. That is why even if the organometallic complex has been left in those pores of the porous medium as a result of the organometallic complex decomposing step described above, that organic compound can also be decomposed effectively.

In the heating treatment described above, the heating temperature preferably falls within the range of 100 to 500° C. The reason is that if the heating temperature were lower than 100° C., the organic compound of the organometallic complex left in those pores of the porous medium could not be decomposed completely in some cases. However, if the heating temperature were higher than 500° C., then the productivity (energy efficiency) would decrease in some cases. That is why this heating temperature range is preferred to avoid these inconveniences.

Also, in the heating treatment described above, the heating duration preferably falls within the range of 0.5 to 2 hours. The reason is that if the heating duration were shorter than 0.5 hours, the temperature distribution would be uneven and it would be difficult to heat the entire porous medium uniformly in some cases. However, if the heating duration were longer than 2 hours, then the porous medium would have already been heated uniformly and the productivity (time efficiency) would decrease in some cases. That is why this duration range is preferred to avoid these inconveniences.

As can be seen from the foregoing description, according to the embodiment described above, metallic nanoparticles can be produced within the pores of a porous medium that is a support. Therefore, even if the metallic nanoparticles are heated to an elevated temperature of 300 to 400° C., for example, in the reduction process step described above, the metallic nanoparticles can still be prevented from moving and adhering to each other.

Consequently, since the metallic nanoparticles can be kept highly dispersed even at such elevated temperatures, the metallic nanoparticles can be prevented from aggregating or getting sintered together and growing excessively. As a result, a decrease in the catalytic activity of the metallic nanoparticles can be suppressed.

In addition, since the present invention is applicable to not only noble metals such as platinum and ruthenium but also cobalt, nickel and other base metals with high catalytic activity as described above, a metallic nanoparticle composite with a broad applicability as a catalyst can be provided.

Furthermore, unlike a nickel-loaded zeolite as the one disclosed in Patent Document 1, only the metallic nanoparticles' catalytic activity can be made full use of, thus providing a metallic nanoparticle composite with good reaction selectivity.

Note that by checking if there is any organic substance such as carbon left in the metallic nanoparticle composite, decision can be made whether or not the given composite is a metallic nanoparticle composite produced by the method of the present invention. Examples of methods for checking if any organic substance is left in the metallic nanoparticle composite include a method in which the sample is heated within an oxygen atmosphere and carbon dioxide and water produced are analyzed with a mass spectrometer or a gas chromatograph, and a CHN analysis.

Also, as described above, the method for producing metallic nanoparticles according to the present invention preferably includes the decomposing step using ultraviolet ray irradiation. In the method for producing metallic nanoparticles according to the present invention, no matter whether this decomposing step is performed or not, the organic compound of the organometallic complex adsorbed into the pores of a porous medium is decomposed into methane ($CH_4$) and other substances through the decomposing and reducing step that is carried out within a reducing atmosphere (e.g., within a hydrogen atmosphere). As a result, the metal cations included in the organometallic complex are reduced into metal and turn into nanoparticles with a mean particle size of 1 to 5 nm. However, by performing the decomposing step using ultraviolet ray irradiation before the decomposing and reducing step, more homogenous nanoparticles that are dispersed more uniformly can be obtained.

Also, although the organometallic complex vaporized gets adsorbed in the adsorbing step into the pores of the porous medium according to the embodiment described above, the organometallic complex vaporized may be replaced with a liquid organometallic complex. For example, organometallic complex ferrocene ($Fe(C5H5)2$) including iron may be dissolved in an organic solvent and adsorbed into the pores of the zeolite.

EXAMPLES

The present invention will now be described by way of illustrative examples. Note that the following examples are not intended to limit the scope of the present invention but readily modifiable or alterable based on the spirit of the present invention without departing from the scope of the present invention.

Example 1

Making Metallic Nanoparticle (Nickel Nanoparticle) Composite

A Type Y zeolite (Synthetic Zeolite HS-320 Powder Sodium Y, which is the name of a product manufactured by Wako Pure Chemical Industries, Ltd., where $SiO_2/Al_2O_3$=5.5) was thermally treated at 600° C. for 20 hours in a vacuum to vaporize adsorbed water.

Next, in a glove box with an argon atmosphere, 500 mg of the zeolite dried and 22 mg of bis(cyclopentadienyl) nickel (II) ($Ni(C5H5)2$) (Bis(cyclopentadienyl) nickel (II), which is the name of a product manufactured by SIGMA-ALDRICH), which is an organic nickel complex, were mixed evenly using a mortar.

Subsequently, a mixture of the Type Y zeolite and bis (cyclopentadienyl) nickel (II) was loaded into a quartz test tube, which was a reaction vessel with an outside diameter of 12 mm, an inside diameter of 10 mm and a length of 100 mm, the pressure inside the test tube was reduced to a pressure of 5 to 7 Pa, and then the test tube was sealed airtight.

Thereafter, this test tube was heated at 130° C. for five hours, thereby causing the bis(cyclopentadienyl) nickel (II) to be sublimated and adsorbed into the pores of the zeolite.

Next, using a xenon lamp, of which the illuminance at a wavelength of 360 nm was 12 mW/cm2, as an ultraviolet light source, that zeolite, which had adsorbed the bis(cyclopentadienyl) nickel (II), was irradiated with an ultraviolet ray for 72 hours, thereby decomposing the organic component of the bis(cyclopentadienyl) nickel (II) and fixing nickel ions in the pores of the zeolite. While being irradiated with the ultraviolet ray, the test tube was shaken every 12 hours to mix the respective components of the sample.

Finally, the zeolite that had been irradiated with an ultraviolet ray was subjected to a heating treatment at 400° C. for an hour within a hydrogen atmosphere, thereby reducing the nickel ions that had been fixed into the pores of the zeolite into nickel and making a nickel nanoparticle composite in which nickel nanoparticles were loaded into the pores of the zeolite.

Subsequently, the nickel nanoparticle composite that was obtained by the method of this example was observed through a transmission electron microscope (JEM-2010, which is the name of a product manufactured by JEOL, Ltd.) with an acceleration voltage of 200 kV. An electron micrograph (i.e., a TEM micrograph) thus shot is shown in FIG. 1.

As can be seen from FIG. 1, the nickel nanoparticles were uniformly dispersed in the zeolite and had a particle size of 5 nm or less.

Also, the content (i.e., the fill density) of nickel in the nickel nanoparticle composite measured 1.9 wt % according to the method to be described later.

Example 2

A nickel nanoparticle composite was made in the same way as in EXAMPLE 1 except that the weight of the bis(cyclopentadienyl) nickel (II), which is an organic nickel complex, was changed into 82 mg.

Also, the content of nickel in the nickel nanoparticle composite measured 5.9 wt % according to the method to be described later.

(Estimation of Specific Surface Area and Pore Volume)

Next, the specific surface areas and pore volumes of the zeolite in the nickel nanoparticle composites obtained by the methods of Examples 1 and 2 were calculated. More specifically, a nitrogen adsorption-desorption measurement was conducted at 77 k using a vapor adsorption system (BEL-SORP 18SP, which is the name of a product manufactured by BEL Japan, Inc.) and the specific surface area and pore volume were estimated by an analysis using the BET method. As preprocessing, the nickel nanoparticle composite was heated at 300° C. for 24 hours in a vacuum.

Also, as a reference example, the specific surface area and pore volume of the Type Y zeolite that was used in this example were also calculated in the same way. The results thus obtained are summarized in the following Table 1:

TABLE 1

|  | Specific surface area [m$^2$/g] | Total pore volume [cm$^3$/g] |
| --- | --- | --- |
| Example 1 | 524 | 0.365 |
| Example 2 | 367 | 0.276 |
| Comparative Example 1 | 560 | 0.401 |
| Comparative Example 2 | 556 | 0.378 |
| Zeolite (reference) | 569 | 0.419 |

As can be seen from Table 1, in the nickel nanoparticle composites obtained in Examples 1 and 2, the specific surface areas and pore volumes of the zeolite decreased compared to the zeolite as a reference example. That is to say, this result suggested that in the nickel nanoparticle composites obtained in Examples 1 and 2, the nickel nanoparticles should have been present inside the pores of the zeolite.

Comparative Example 1

A nickel-loaded zeolite was produced by a general impregnation method. Specifically, first of all, 0.063 g of nickel chloride (II) hexahydrate (manufactured by SIGMA-ALDRICH) was dissolved in 20 ml of deionized water.

Next, 1 g of a Type Y zeolite (Synthetic Zeolite HS-320 Powder Sodium Y, which is the name of a product manufactured by Wako Pure Chemical Industries, Ltd., where SiO2/Al2O3=5.5) was added to a nickel chloride aqueous solution prepared. Then, the mixture thus obtained was heated and dried while being stirred up by a hot stirrer.

Then, the powder thus obtained was loaded onto an alumina boat and thermally treated at 400° C. for three hours in the air, thereby obtaining a sample representing COMPARATIVE EXAMPLE 1. To reduce the sample thus obtained, the sample was further heated at 400° C. for 30 minutes within a hydrogen atmosphere.

Subsequently, the reduced sample was observed through the transmission electron microscope mentioned above. Electron micrographs (TEM micrographs) thus shot are shown in FIGS. 2 and 3.

Figure 2:
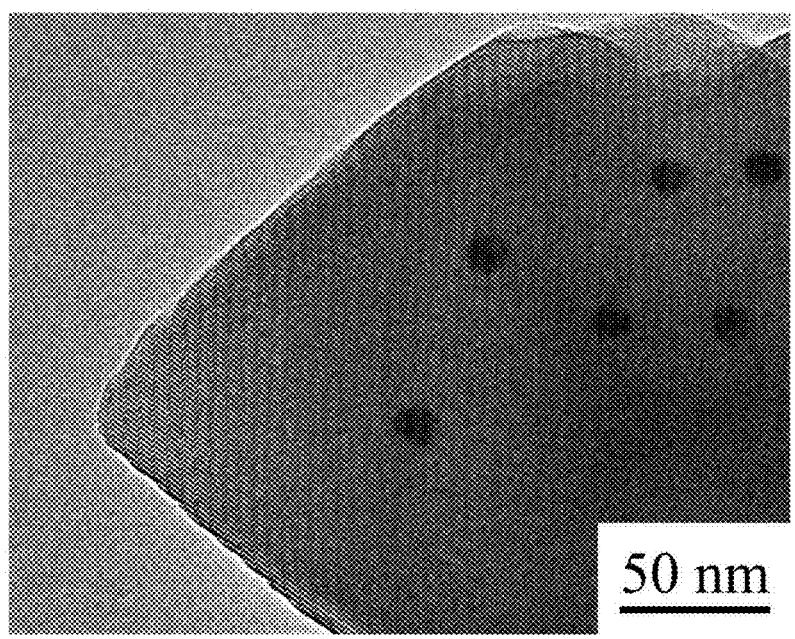
FIG. 2 An electron micrograph (TEM micrograph) of a nickel-loaded zeolite according to COMPARATIVE EXAMPLE 1.
Figure 3:
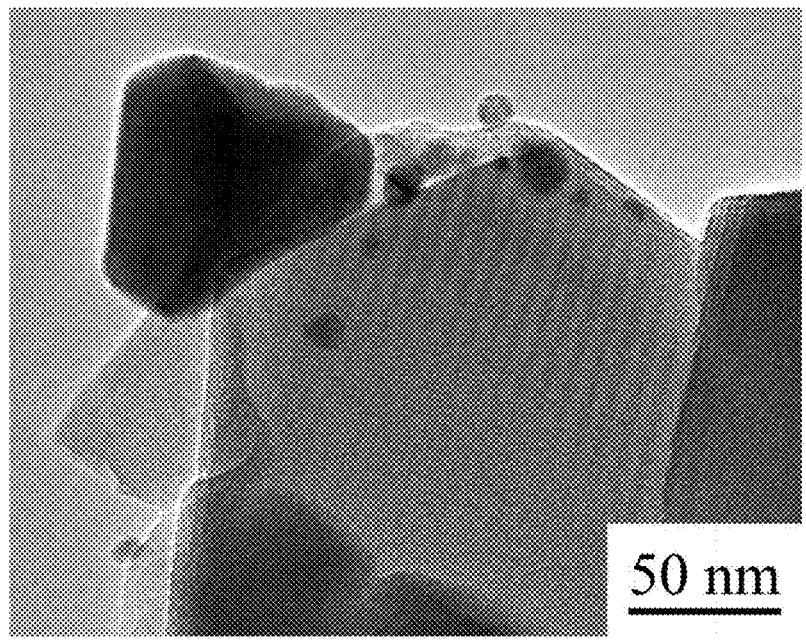
FIG. 3 An electron micrograph (TEM micrograph) of the nickel-loaded zeolite of COMPARATIVE EXAMPLE 1.

As shown in FIG. 2, the nickel particles of COMPARATIVE EXAMPLE 1 aggregated together on the zeolite to have a particle size of greater than 5 nm. Particularly, as can be seen from FIG. 3, there were some excessively grown particles with a particle size of greater than 50 nm.

Also, the content of nickel in the nickel-loaded zeolite measured 2.2% according to the method to be described later.

Comparative Example 2

A nickel-loaded zeolite was produced in the same way as in COMPARATIVE EXAMPLE 1 described above except that the weight of the nickel chloride (II) hexahydrate used was changed into 0.156 g.

Also, the content of nickel in the nickel-loaded zeolite measured 5.7% according to the method to be described later.

(Estimation of Specific Surface Areas and Pore Volumes)

In these COMPARATIVE EXAMPLES 1 and 2, the specific surface areas and pore volumes of the reduced samples were also measured in the same way as in EXAMPLES 1 and 2. The results are also summarized in Table 1. As can be seen from Table 1, zeolites of the samples obtained in COMPARATIVE EXAMPLES 1 and 2 had approximately the same specific surface areas and pore volumes as the zeolite as the reference example. This result suggests that there should have been some nickel particles on the external surface of the zeolite.

Also, on the external surface of the zeolite, the nickel particles can move more freely than inside the pores of the zeolite. For that reason, in COMPARATIVE EXAMPLE 1, the nickel particles would have adhered and aggregated together to cause aggregation and sintering under the heat and would have grown excessively as shown in FIGS. 2 and 3.

Furthermore, as shown in Table 1, in the nickel nanoparticle composites obtained in EXAMPLES 1 and 2, as the nickel content increased, the pore volume decreased more significantly than the zeolite as the reference example. It can also be seen that in the nickel-loaded zeolites obtained in COMPARATIVE EXAMPLES 1 and 2, however, even when the nickel content increased, the pore volume hardly changed and remained almost the same as the zeolite as the reference example.

These results were obtained probably for the following reasons. Specifically, in the nickel nanoparticle composites obtained in EXAMPLES 1 and 2, the pore volumes were small because the pores of the zeolite would have been occupied by nickel particles. In the nickel-loaded zeolites obtained in COMPARATIVE EXAMPLES 1 and 2, however, the pore volumes hardly changed, because there would have been nickel particles on the external surface of the zeolites and because nitrogen atoms would have entered the zeolites through the surface not covered with the nickel particles and could have diffused freely inside the zeolites.

These results reveal that in the nickel nanoparticle composites obtained in EXAMPLES 1 and 2, nickel nanoparticles would have been present inside the pores of the zeolites.

Comparative Example 3

A nickel-loaded zeolite was produced by the method of Patent Document 1. More specifically, first of all, 100 g of a Type X zeolite (Molecular Sieves 13X, which is the name of a product manufactured by SIGMA-ALDRICH) was added to 1000 ml of 1M ammonium acetate aqueous solution (also manufactured by SIGMA-ALDRICH). Then, the mixture was stirred up at room temperature for 24 hours, thereby exchanging sodium ions in the zeolite for ammonium ions.

Next, to exchange some of the cations for nickel ions, the mixture was washed with water, dried, and then 10 g of a powder thus obtained was added to 1000 ml of 0.01M nickel chloride aqueous solution (manufactured by SIGMA-ALDRICH). Then, the mixture was stirred up at room temperature for 24 hours.

Subsequently, 0.4 g of a zeolite that was washed with water and dried after having been deionized was thermally treated at 200° C. (at a temperature increase rate of 10° C./min) for 4 hours in the air to obtain a sample representing COMPARATIVE EXAMPLE 3. After that, to reduce the sample thus obtained, the sample was then heated at 400° C. for 30 minutes within a hydrogen atmosphere.

Subsequently, the reduced sample was observed through the transmission electron microscope mentioned above. An electron micrograph (TEM micrograph) thus obtained is shown in FIG. 4.

Figure 4:
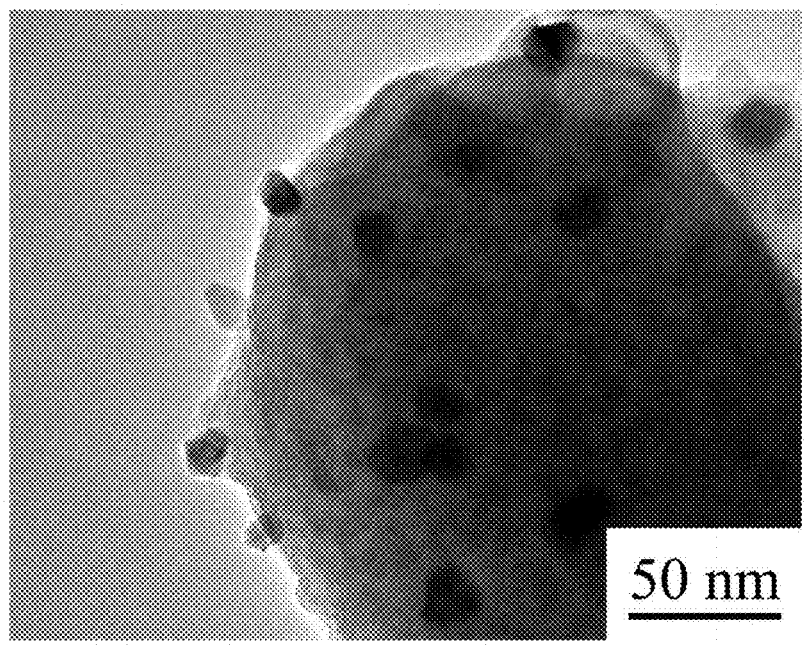
FIG. 4 An electron micrograph (TEM micrograph) of a nickel-loaded zeolite according to COMPARATIVE EXAMPLE 3.

As can be seen from FIG. 4, the nickel particles of COMPARATIVE EXAMPLE 3 aggregated together on the zeolite, and there were some excessively grown nickel particles with a particle size of 10 nm to 20 nm there.

(Evaluation of Catalytic Activity in Ethanol Steam Reforming Reaction)

Next, using a fixed bed, fluidized bed reactor, the nickel nanoparticle composite obtained in EXAMPLE 1 was subjected to an ethanol steam reforming reaction (for a reaction duration of six hours), thereby evaluating the catalytic activity of the nickel nanoparticle composite obtained in EXAMPLE 1.

More specifically, 50 mg of quartz wool was put into a reactor of quartz tube (with an outside diameter of 12 mm and an inside diameter of 10 mm) and then the rector was filled with 100 mg of a nickel nanoparticle composite acting as a catalyst.

Subsequently, the sample was reduced at 400° C. for an hour in a 3% hydrogen steam (at a flow rate of 30 ml/min and the rest of the steam was argon), and then the atmosphere inside the reactor was replaced with argon.

Thereafter, 15 wt % of ethanol aqueous solution that had vaporized at 200° C. was supplied at a mass space velocity of 40.5 per hour. Then, argon was supplied as a carrier gas at a rate of 10 ml/min with the sample maintained at 400° C.

Next, the water contained in the reacted gas was removed using a cold trap (at 0° C.). Then, the composition of the gas generated was analyzed using a gas chromatograph (GC-14B, column, which is the name of a product manufactured by Shimadzu Corporation) with a thermal conductivity detector (Shincarbon-ST, 2m, which is the name of a product also produced by Shimadzu Corporation) to confirm that hydrogen and ethylene had been generated.

Figure 5:
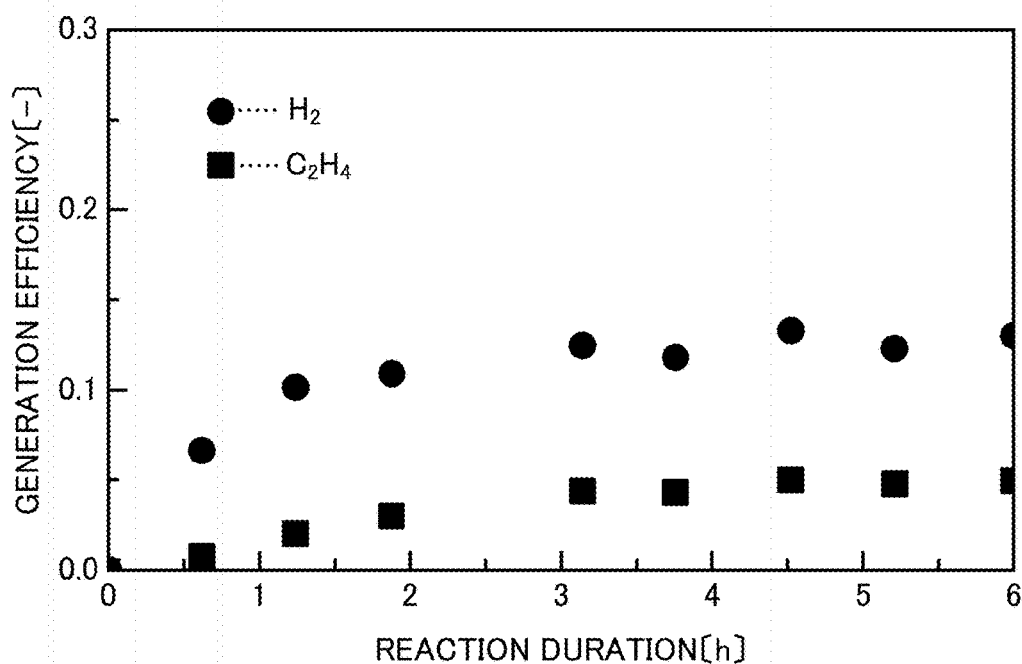
FIG. 5 A graph showing how the generation efficiencies of hydrogen and ethylene changed when the metallic nanoparticle composite of EXAMPLE 1 was used as a catalyst for a steam reforming reaction of ethanol.

Next, the ratio of the products (i.e., hydrogen and ethylene) to the ethanol supplied (i.e., generation efficiency) was calculated by the following Equation (1), thereby evaluating the catalytic activity. The results are shown in FIG. 5.

Figure 7:
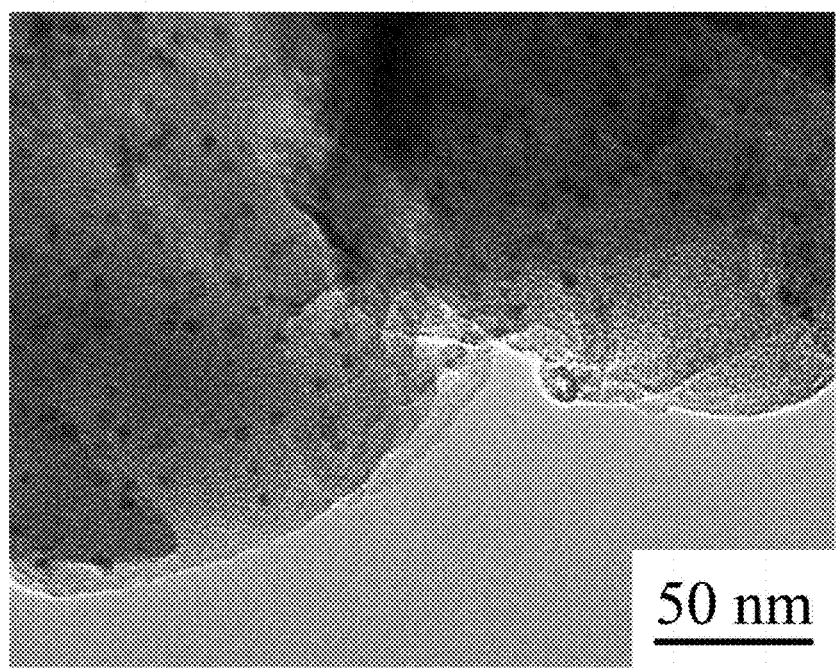
FIG. 7 An electron micrograph (TEM micrograph) of a nickel nanoparticle composite according to EXAMPLE 1 that went through the steam reforming reaction of ethanol.

An electron micrograph (TEM micrograph) of the nickel nanoparticle composite that had been subjected to the ethanol steam reforming reaction is shown in FIG. 7. As shown in FIG. 7, the nickel nanoparticles that had been subjected to the steam reforming reaction were dispersed in the zeolite as uniformly as the nickel nanoparticles shown in FIG. 1. That is to say, their degree of dispersion did not change.

[Equation 1]

Ratio of products to ethanol(generation efficiency)
=rate of generation [mol/min] of products/rate
of supply [mol/min] of ethanol       (1)

Figure 6:
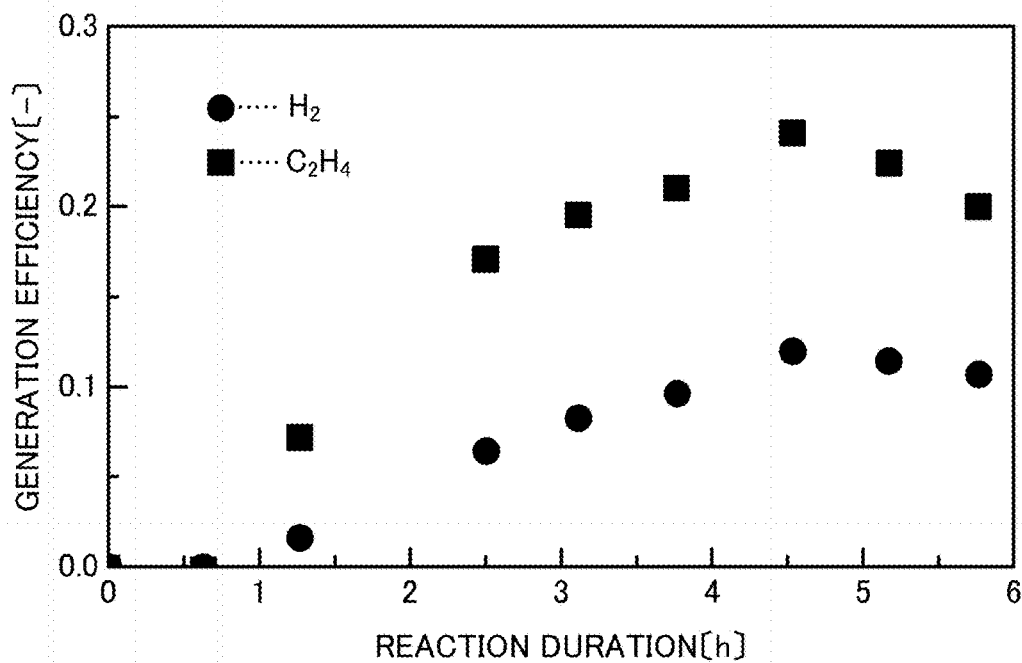
FIG. 6 A graph showing how the generation efficiencies of hydrogen and ethylene changed when the nickel-loaded zeolite of COMPARATIVE EXAMPLE 3 was used as a catalyst for a steam reforming reaction of ethanol.

Meanwhile, the nickel-loaded zeolite obtained in COMPARATIVE EXAMPLE 3 was also subjected in the same way to the ethanol steam reforming reaction, thereby evaluating the catalytic activity of the nickel-loaded zeolite obtained in COMPARATIVE EXAMPLE 3. In this case, the ethanol aqueous solution was supplied at a mass space velocity of 30.9 per hour. The results are shown in FIG. 6.

In this case, as an elementary reaction of the ethanol steam reforming reaction represented by the following Formula (2), the dehydrogenation reaction of ethanol is promoted by the action of a metallic catalyst represented by the following Formula (3). In addition, as a competing reaction that inhibits generation of hydrogen, the dehydrogenation reaction of ethanol is also promoted by the action of an acid catalyst represented by the following Formula (4):

[Chemical Formula 1]

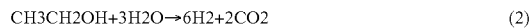

$$CH_3CH_2OH + 3H_2O \rightarrow 6H_2 + 2CO_2 \qquad (2)$$

[Chemical Formula 2]

$$CH_3CH_2OH \rightarrow CH_3CHO + H_2 \qquad (3)$$

[Chemical Formula 3]

$$CH_3CH_2OH \rightarrow CH_3CH_2 + H_2O \qquad (4)$$

Also, if the steam reforming reaction is employed as a technique for producing hydrogen, then the ethylene generated through the dehydrogenation reaction represented by Formula (4) will turn into coke, thus possibly causing catalyst poisoning. For that reason, it can be said that the selectivity of the dehydrogenation reaction represented by Formula (4) is preferably low.

If the nickel nanoparticle composite obtained in EXAMPLE 1 is used as a catalyst, hydrogen is obtained as a main reaction product as shown in FIG. 5. Thus, it can be seen that the action of the metallic catalyst as represented by Formula (3) increases the selectivity of the dehydrogenation reaction of ethanol.

On the other hand, if the nickel-loaded zeolite obtained in COMPARATIVE EXAMPLE 3 is used as a catalyst, ethylene is obtained as a main reaction product as shown in FIG. 6. Thus, it can be seen that the action of the acid catalyst as represented by Formula (4) increases the selectivity of the dehydrogenation reaction of ethanol.

That is to say, in the nickel-loaded zeolite of COMPARATIVE EXAMPLE 3, the hydrogen ions generated by decomposition of ammonium ions function as strong acid centers, thus allowing the catalyst properties of both of nickel and acid centers to be expressed in the same composite. In addition, since there are also a lot of acid centers that act as a catalyst more strongly than nickel particles, the selectivity of the reaction decreases so much that the use as the nickel catalyst is limited. However, it can be seen that in EXAMPLE 1, the catalyst property of only the nickel nanoparticles is allowed to be expressed, and therefore, a nickel nanoparticle composite with excellent reaction selectivity can be provided.

(Estimation of Nickel Content)

Next, the nickel contents of the respective samples obtained in EXAMPLES 1 and 2 and COMPARATIVE EXAMPLES 1 to 3 were measured. More specifically, to remove organic substances and anions from each of those samples, each sample was heated at 600° C. for three hours in the air.

Subsequently, using an X-ray fluorescence spectrometer (ZSX Primus II, which is the name of a product manufactured by RIGAKU Corporation), the nickel contents of the respective samples obtained in EXAMPLE 1 and COMPARATIVE EXAMPLES 1 and 2 were measured. The results are summarized in the following Table 2:

TABLE 2

|  | Nickel content [wt %] |
| --- | --- |
| EXAMPLE 1 | 1.9 |
| EXAMPLE 2 | 5.9 |
| COMPARATIVE EXAMPLE 1 | 2.2 |
| COMPARATIVE EXAMPLE 2 | 5.7 |
| COMPARATIVE EXAMPLE 3 | 8.0 |

As can be seen from Table 2, the nickel content of the nickel nanoparticle composite of EXAMPLE 1 is about a quarter of that of the nickel-loaded zeolite of COMPARATIVE EXAMPLE 3, but the hydrogen generation efficiency of EXAMPLE 1 is approximately as high as that of COMPARATIVE EXAMPLE 3 (see FIGS. 5 and 6). Thus, it can be seen that the hydrogen generation efficiency per unit weight of the nickel particles in the nickel nanoparticle composite of EXAMPLE 1 is approximately four times as high as that of the nickel particles in the nickel-loaded zeolite of COMPARATIVE EXAMPLE 2.

Also, as can be seen from Table 2, the nickel content of the nickel nanoparticle composite of EXAMPLE 1 is approximately as large as that of the nickel-loaded zeolite of COMPARATIVE EXAMPLE 1. However, the nickel particles of EXAMPLE 1 have a particle size of 5 nm, whereas some nickel particles of COMPARATIVE EXAMPLE 1 have a particle size of greater than 50 nm, as described above. That is to say, there was a significant difference in the particle size of nickel particles between them. Thus, it can be seen that the thermal stability of the nickel particles of EXAMPLE 1 (i.e., their degree of dispersion at a high temperature) is much superior to that of the nickel particles of COMPARATIVE EXAMPLE 1 that were produced by a general impregnation method.

(Effect of Ultraviolet Ray Irradiation)

Next, a structural change of an organic compound to be caused by irradiating an organic nickel complex with an ultraviolet ray was evaluated. More specifically, bis(cyclopentadienyl) nickel (II) was loaded as an organic nickel complex into a quartz test tube, which was a reaction vessel with an outside diameter of 12 mm, an inside diameter of 10 mm and a length of 100 mm, the pressure inside the test tube was reduced to 5 to 7 Pa, and then the test tube was sealed airtight. Next, using a xenon lamp, of which the illuminance at a wavelength of 360 nm was 12 mW/cm2, as an ultraviolet light source, the bis(cyclopentadienyl) nickel (II) was irradiated with an ultraviolet ray for 72 hours, thereby decomposing the organic component of the bis(cyclopentadienyl) nickel (II). While being irradiated with the ultraviolet ray, the test tube was shaken every 12 hours to mix the respective components of the sample.

Figure 9:
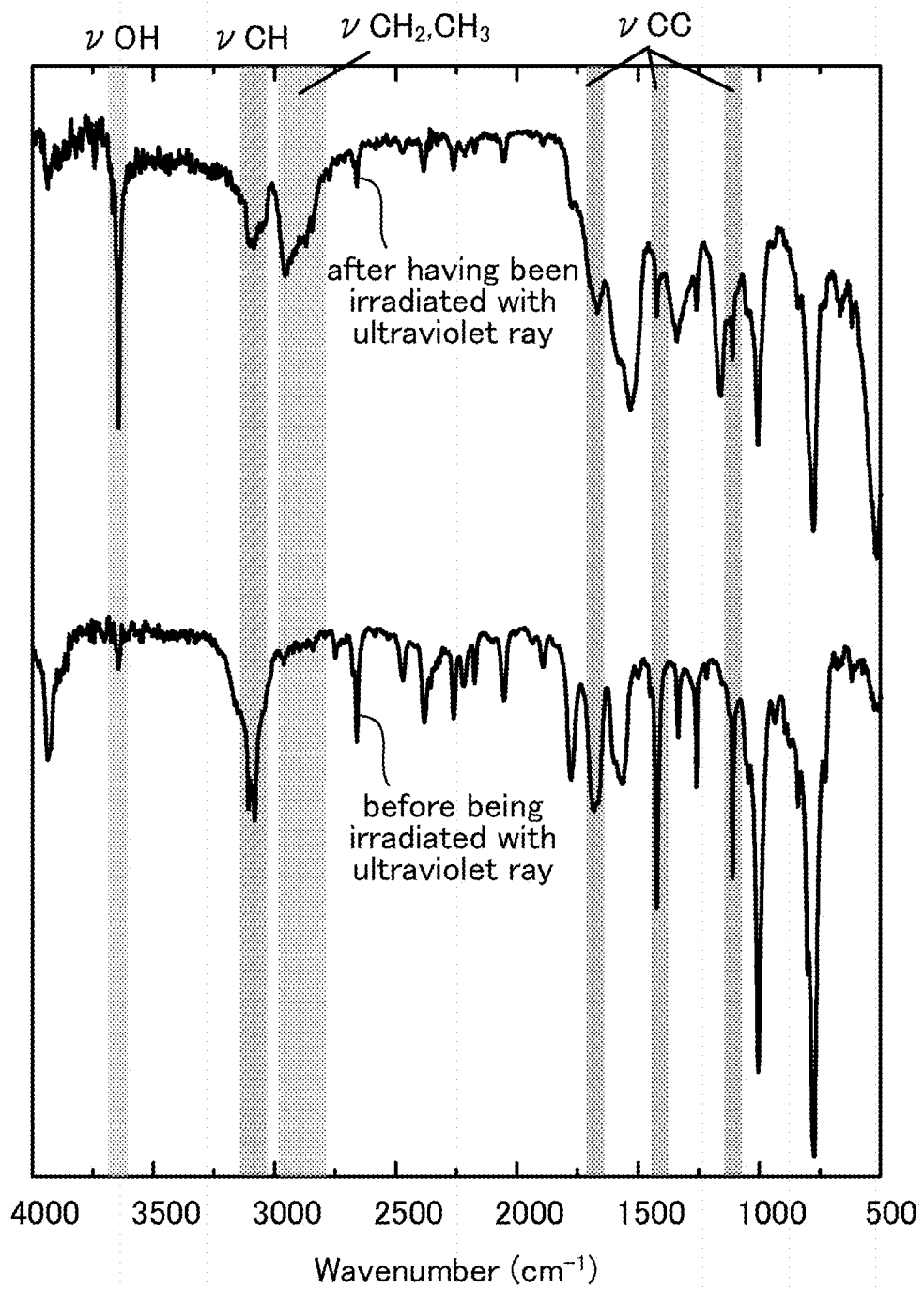
FIG. 9 A graph showing the data of an IR spectrum for a metallic nanoparticle composite according to an example of the present invention.

Next, before and after having been irradiated with the ultraviolet ray, the bis(cyclopentadienyl) nickel (II) was diluted to 10 mass % with potassium bromide to evaluate the structure of the organic compound of the organometallic complex by infrared spectroscopy (Spectrum One, Perkin Elmer, USA). As a spectrometer, an infrared spectrometer (Spectrum One, which is the name of a product manufactured by Perkin Elmer) was used. FIG. 9 is a graph showing the data of an IR spectrum thus obtained.

As can be seen from FIG. 9, intensities at peaks derived from C—H stretching vibrations (at wavelengths of around 3095 and 3082 cm-1) and an intensity at a peak of absorption derived from a C═C stretching vibration (at a wavelength of around 1670 cm-1) decreased upon the ultraviolet ray irradiation. Meanwhile, it can also be seen that a peak derived from an O—H stretching vibration (at a wavelength of around 3643 cm-1) and peaks derived from CH2 and CH3 stretching vibrations (at wavelengths of around 2845 and 2950 cm-1) appeared. These results reveal that the structure of the organic compound of the organometallic complex changed upon the ultraviolet ray irradiation.

As a comparative example, a nickel-loaded zeolite was also produced by being reduced in a hydrogen atmosphere without being irradiated with an ultraviolet ray. More specifically, a sample was made in the same way as in EXAMPLE 1 described above except that the sample was not irradiated with any ultraviolet ray using a xenon lamp as an ultraviolet light source.

Figure 11:
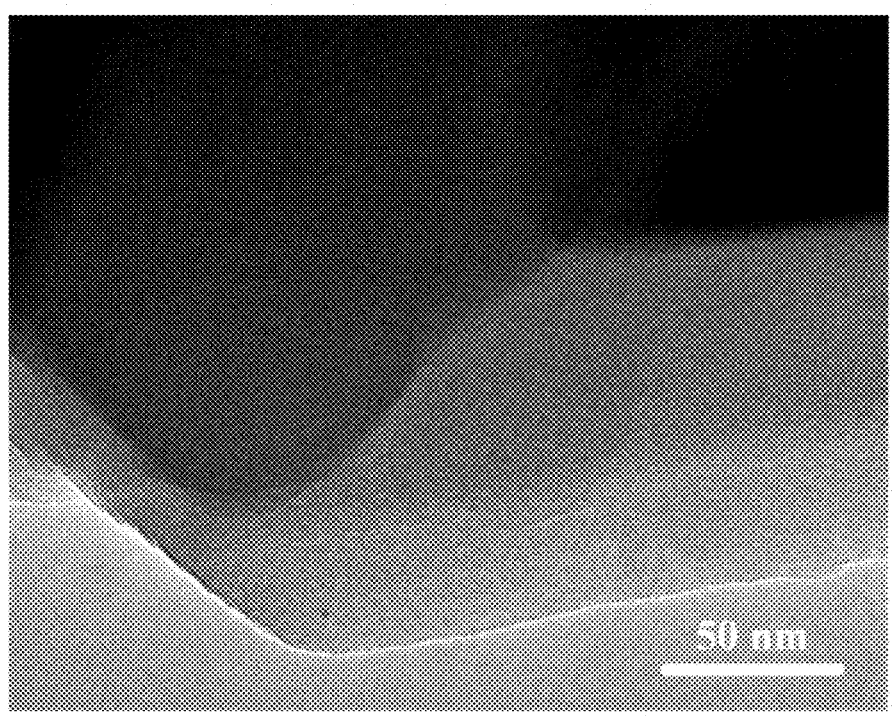
FIG. 11 An electron micrograph (TEM micrograph) of the comparative example which was not irradiated with any ultraviolet ray.
Figure 12:
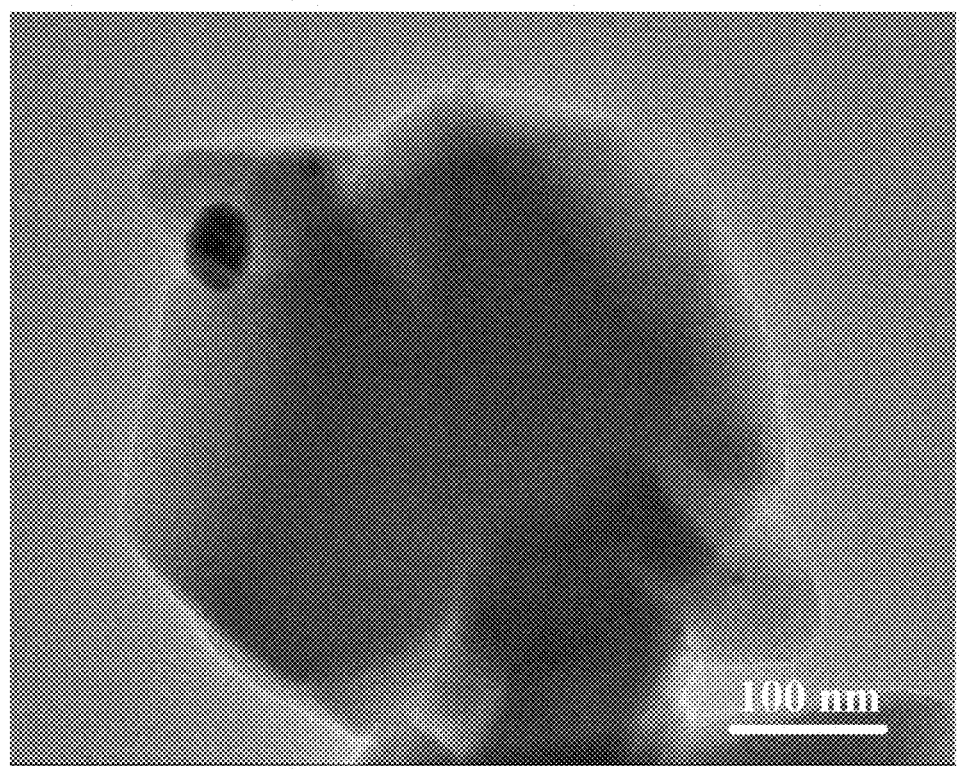
FIG. 12 An electron micrograph (TEM micrograph) of the comparative example which was not irradiated with any ultraviolet ray.

Next, the sample thus made was observed through the transmission electron microscope mentioned above. Electron micrographs (TEM micrographs) thus shot are shown in FIGS. 10 to 12.

Figure 10:
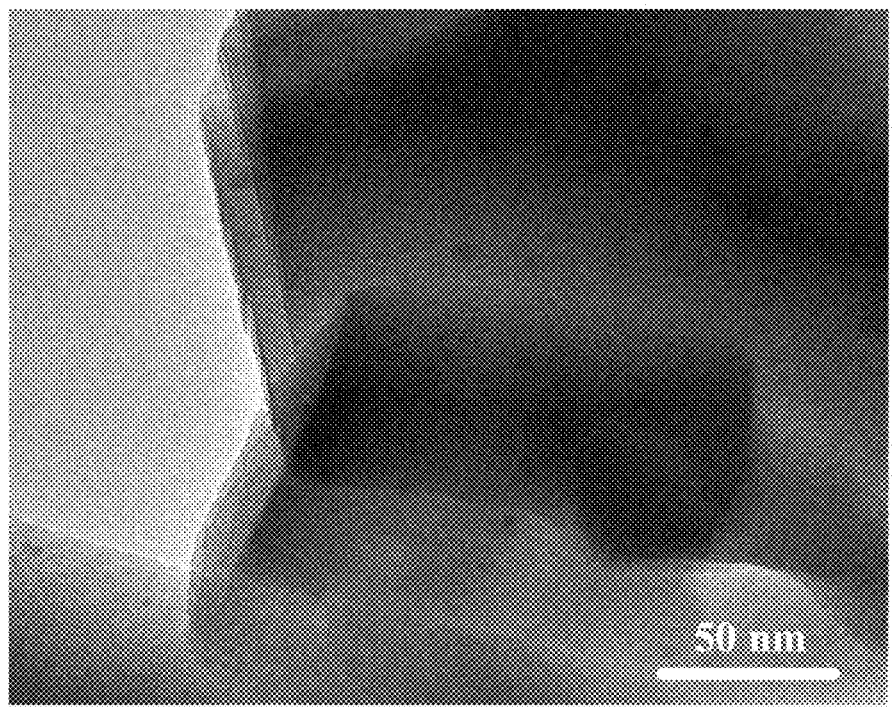
FIG. 10 An electron micrograph (TEM micrograph) of a comparative example which was not irradiated with any ultraviolet ray.

As shown in FIG. 10, in the sample of this comparative example, nickel nanoparticles with a diameter of 5 nm or less which were dispersed rather uniformly could be obtained even without being irradiated with an ultraviolet ray. However, the sample of the comparative example also had portions with no nickel particles at all as shown in FIG. 11 and also had excessively grown particles as shown in FIG. 12. Thus, it can be seen that the nickel particles were dispersed less uniformly in the sample of this comparative example than in the nickel nanoparticle composite of EXAMPLE 1.

These results were obtained probably for the following reasons. Specifically, in the nickel nanoparticle composite of EXAMPLE 1, the organometallic complex would have been partially decomposed and fixed in the pores of the zeolite by being irradiated with an ultraviolet ray. On the other hand, in the sample of the comparative example that was not irradiated with any ultraviolet ray, the organometallic complex would not have been fixed in the pores of the zeolite, therefore, and part of the organometallic complex would have desorbed itself from the pores under the heat of the decomposing and reducing step to cause the particles to be dispersed less uniformly.

(Evaluation of Catalytic Activity in Ammonia Decomposition Reaction)

Next, using a reaction vessel with a constant volume, the nickel nanoparticle composite obtained in EXAMPLE 1 was subjected to an ammonia decomposition reaction to evaluate its catalytic activity.

Meanwhile, as comparative examples, a nickel-loaded zeolite (corresponding to the sample obtained in COMPARATIVE EXAMPLE 1), nickel-loaded alumina (Al2O3), and a ruthenium-loaded zeolite were produced by a general impregnation method.

Specifically, first of all, 0.130 g of nickel chloride (II) hexahydrate (manufactured by SIGMA-ALDRICH) was dissolved in 25 ml of deionized water. Next, 2.500 g of alumina (Aluminum Oxide nanopowder, which is the name of a product manufactured by Aldrich; having a particle size of <50 nm (according to TEM)) was added to 25 ml of a nickel chloride aqueous solution prepared. Then, the mixture thus obtained was heated and dried while being stirred up by a hot stirrer.

Then, the powder thus obtained was loaded onto an alumina boat and thermally treated at 400° C. for three hours in the air, thereby obtaining nickel-loaded alumina (Al2O3) as a sample representing a comparative example. To reduce the sample thus obtained, the sample was further heated at 400° C. for 60 minutes within a hydrogen atmosphere.

Meanwhile, a ruthenium-loaded zeolite was obtained as a sample representing a comparative example in the same way except that the nickel chloride (II) hexahydrate was replaced with 0.061 g of ruthenium chloride (ruthenium chloride (III), which is the name of a product manufactured by SIGMA-ALDRICH) and that the alumina was replaced with 1.000 g of a Type Y zeolite (Synthetic Zeolite HS-320 Powder Sodium Y, which is the name of a product manufactured by Wako Pure Chemical Industries, Ltd., where SiO2/Al2O3=5.5).

Furthermore, an activated charcoal on which retailed ruthenium was loaded (including 5% of ruthenium and produced by Wako Pure Chemical Industries, Ltd.) was used as another comparative example.

Figure 13:
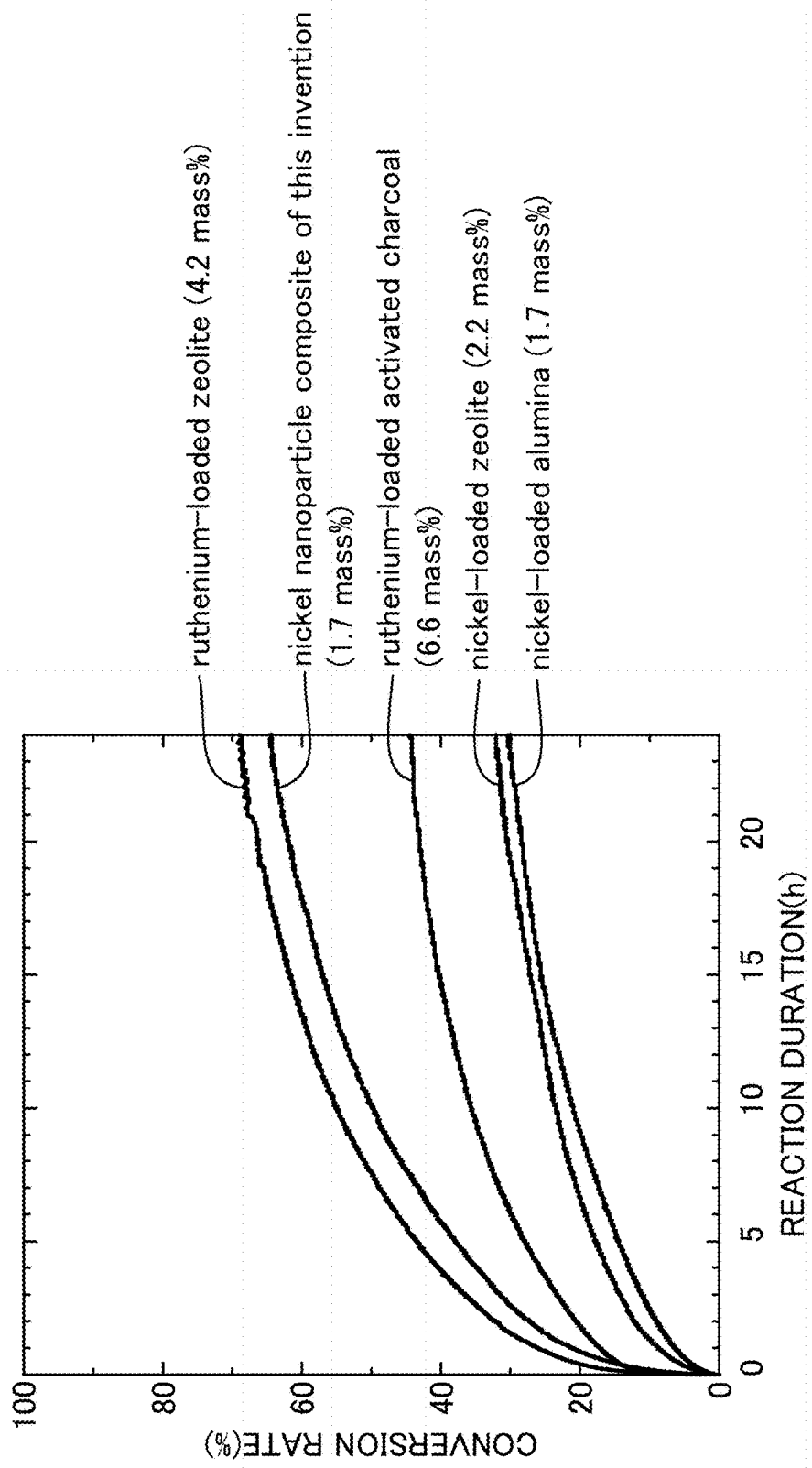
FIG. 13 A graph showing the conversion rate of ammonia in an ammonia decomposition reaction.

Next, a thermal decomposition reaction of ammonia represented by the following Formula (5) was allowed to be caused using, as catalysts, the nickel nanoparticle composite obtained in EXAMPLE 1 and those samples prepared as the respective comparative examples, and the conversion rate of ammonia was calculated by the following Equation (6), thereby evaluating the catalytic activity. The results are shown in FIG. 13.

Note that the thermal decomposition reaction of ammonia was caused in a sealed reactor with a constant volume. More specifically, a sample tube of Inconel (with an outside diameter of 12 mm and an inside diameter of 10 mm) was filled with 100 mg of the nickel nanoparticle composite obtained in EXAMPLE 1 (or each of the samples prepared as the comparative examples) and then heated to 500° C. within a vacuum. Subsequently, after the temperature of the sample was stabilized at 500° C., the sample tube was filled with 0.100 MPa of ammonia to monitor a variation in pressure with the progress of the reaction for 24 hours.

In this case, through the decomposition reaction, 2 moles of ammonia was consumed and a total of 4 moles of gases (i.e., comprised of 3 moles of hydrogen and 1 moles of nitrogen) were generated. Consequently, 2 moles (=4 moles−2 moles) of gases increased through the decomposition reaction, and the pressure increased as a result. That is to say, the pressure increased to a degree corresponding to the ammonia converted, and therefore, the rate of conversion is calculated by the following Equation (6):

[Formula 4]

$$2NH_3 \rightarrow 3H_2 + N_2 \quad (5)$$

[Equation 2]

$$\text{Rate of conversion } [\%] = (P-P_o)/P_o \times 100 \quad (6)$$

where P is the pressure and Po is the ammonia filling pressure.

As can be seen from FIG. 13, the nickel nanoparticle composite obtained in EXAMPLE 1 exhibited much superior catalytic activity to nickel particles that were loaded by a general impregnation method, and had almost as high ability as a ruthenium catalyst that was loaded on a zeolite by the impregnation method.

The ammonia decomposition rate (reaction rate constant) was also calculated in an initial stage in which the partial pressure of ammonia decreased from 1 to 0.9. As the reaction rate constant, an equilibrium constant k was obtained by fitting the gradient of the curve indicating a declining ammonia partial pressure to an exponential reaction rate equation (Y=Y0+Aexp(−kT)) using Origin Pro 8J SR1 v8.0773 (manufactured by Origin Lab Corporation). The results are summarized in the following Table 3:

TABLE 3

| Catalyst | Reaction rate constant |
|---|---|
| Nickel nanoparticle composite | 19 |
| Nickel-loaded zeolite | 4 |
| Nickel-loaded alumina | 2 |
| Ruthenium-loaded zeolite | 57 |
| Ruthenium-loaded activated charcoal | 44 |

As can be seen from Table 3, the nickel nanoparticle composite obtained in EXAMPLE 1 achieved approximately 5 to 10 times as high a decomposition rate as the nickel particles loaded by the general impregnation method.

(Evaluation of Long-Term Stability)

Using, as a catalyst, the nickel nanoparticle composite obtained in EXAMPLE 1, the catalytic activity in the ammonia decomposition reaction described above was evaluated five times, thereby evaluating the degree of long-term stability. While each test was carried out, the sample was cooled to room temperature, and then the atmosphere inside the system was replaced with argon. The results thus obtained are shown in FIG. 14.

Figure 14:
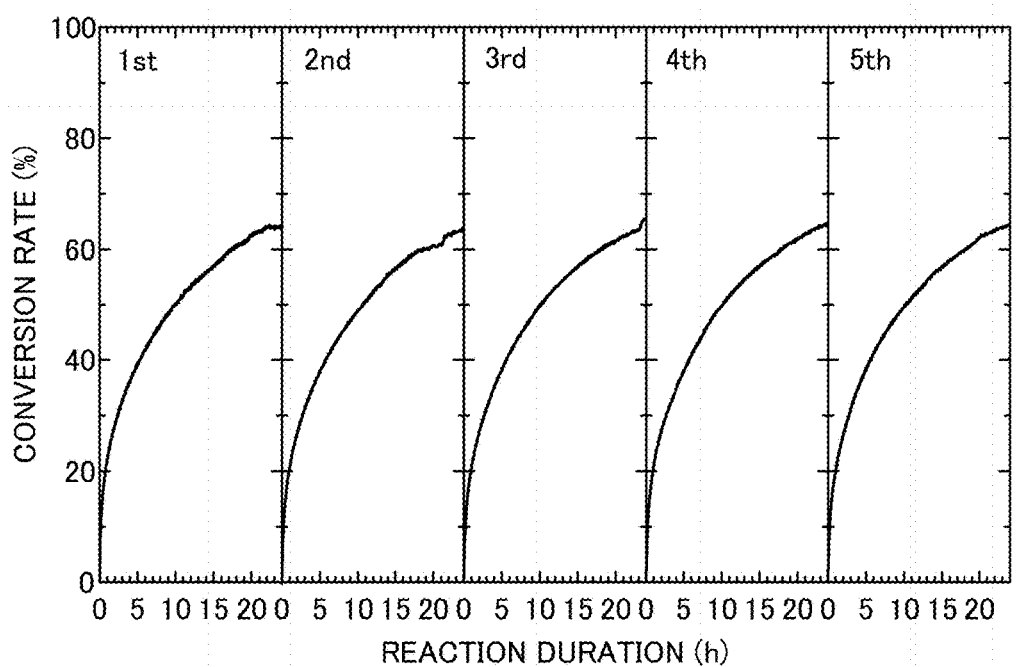
FIG. 14 A graph showing the long-term stability of a metallic nanoparticle composite according to EXAMPLE 1 of the present invention.

As can be seen from FIG. 14, when the nickel nanoparticle composite obtained in EXAMPLE 1 was used as a catalyst, sufficiently high catalytic activity could be maintained, no matter how many times the ammonia decomposition reaction was repeated.

Figure 15:
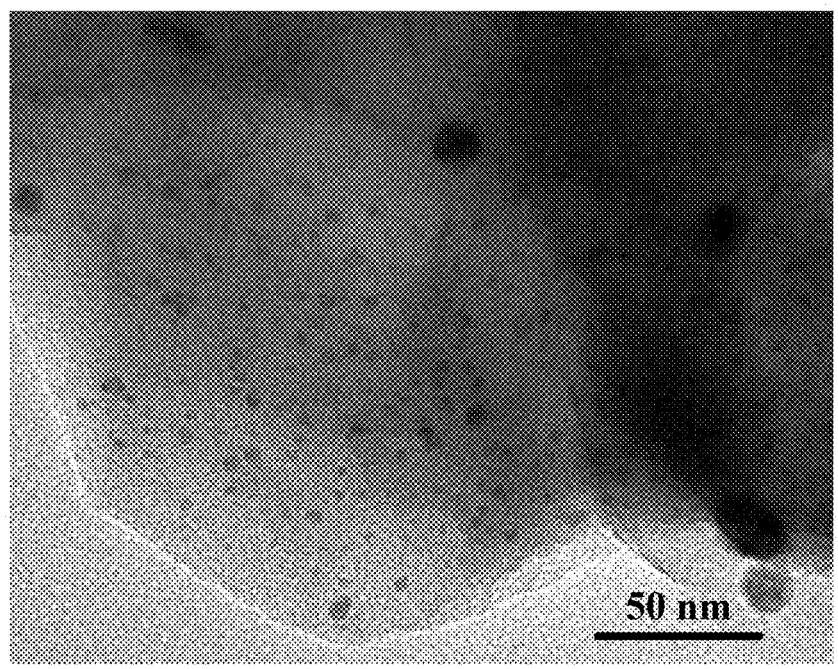
FIG. 15 An electron micrograph (TEM micrograph) of a metallic nanoparticle composite according to EXAMPLE 1 of the present invention that went through an ammonia decomposition reaction only once.
Figure 16:
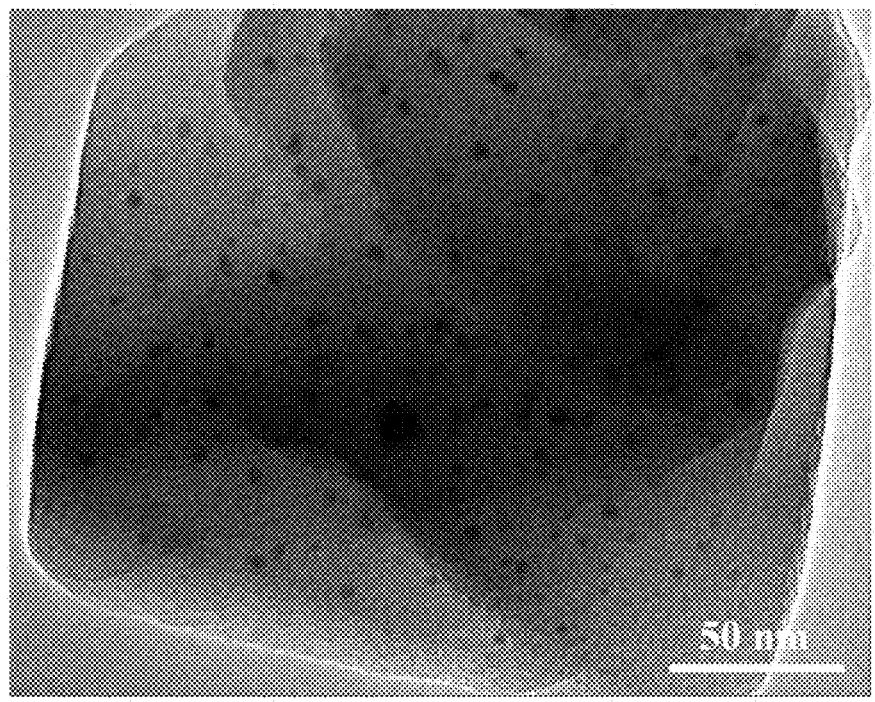
FIG. 16 An electron micrograph (TEM micrograph) of a metallic nanoparticle composite according to EXAMPLE 1 of the present invention that went through the ammonia decomposition reaction seven times.

FIG. 15 is an electron micrograph (TEM micrograph) of the nickel nanoparticle composite that had gone through the ammonia decomposition reaction described above that was carried out only once using the nickel nanoparticle composite of EXAMPLE 1 as a catalyst. FIG. 16 is an electron micrograph (TEM micrograph) of the nickel nanoparticle composite that had gone through the ammonia decomposition reaction described above that was carried out seven times.

As can be seen from FIGS. 15 and 16, in the nickel nanoparticle composite obtained in EXAMPLE 1, most of the nickel nanoparticles were kept uniformly dispersed in the zeolite and had a particle size of 5 nm or less, even after the nickel nanoparticle composite had gone through the ammonia decomposition reaction a number of times. That is to say, it can be seen that the nickel nanoparticle composite obtained in EXAMPLE 1 could withstand a long-term use and exhibited extremely high thermal stability.

Example 3

Making Cobalt Nanoparticle Composite

A Type Y zeolite (Synthetic Zeolite HS-320 Powder Sodium Y, which is the name of a product manufactured by Wako Pure Chemical Industries, Ltd., where $SiO_2/Al_2O_3$=5.5) was thermally treated at 600° C. for 20 hours in a vacuum to vaporize adsorbed water.

Next, in a glove box with an argon atmosphere, 200 mg of the zeolite dried and 9 mg of bis(cyclopentadienyl) cobalt (II) (Co(C5H5)2) (Bis(cyclopentadienyl) cobalt (II), which is the name of a product manufactured by SIGMA-ALDRICH), which is an organic cobalt complex, were mixed evenly using a mortar.

Subsequently, a mixture of the Type Y zeolite and bis(cyclopentadienyl) cobalt (II) was loaded into a quartz test tube, which was a reaction vessel with an outside diameter of 12 mm, an inside diameter of 10 mm and a length of 100 mm, the pressure inside the test tube was reduced to 5 to 7 Pa, and then the test tube was sealed airtight.

Thereafter, this test tube was heated at 130° C. for eight hours, thereby causing the bis(cyclopentadienyl) cobalt (II) to be sublimated and adsorbed into the pores of the zeolite.

Subsequently, the test tube that was sealed airtight in a reduced pressure state was opened in the air to expose the inside of the test tube to the air.

Next, using a xenon lamp, of 0 which the illuminance at a wavelength of 360 nm was 12 mW/cm2, as an ultraviolet light source, that zeolite, to which the bis(cyclopentadienyl) cobalt (II) had been adsorbed, was irradiated with an ultraviolet ray for 72 hours, thereby decomposing the organic component of the bis(cyclopentadienyl) cobalt (II) and fixing cobalt ions in the pores of the zeolite.

Finally, the zeolite that had been irradiated with an ultraviolet ray was subjected to a heating treatment at 400° C. for an hour within a hydrogen atmosphere, thereby reducing the cobalt ions that had been fixed into the pores of the zeolite into cobalt and making a cobalt nanoparticle composite in which cobalt nanoparticles were loaded into the pores of the zeolite.

Figure 18:
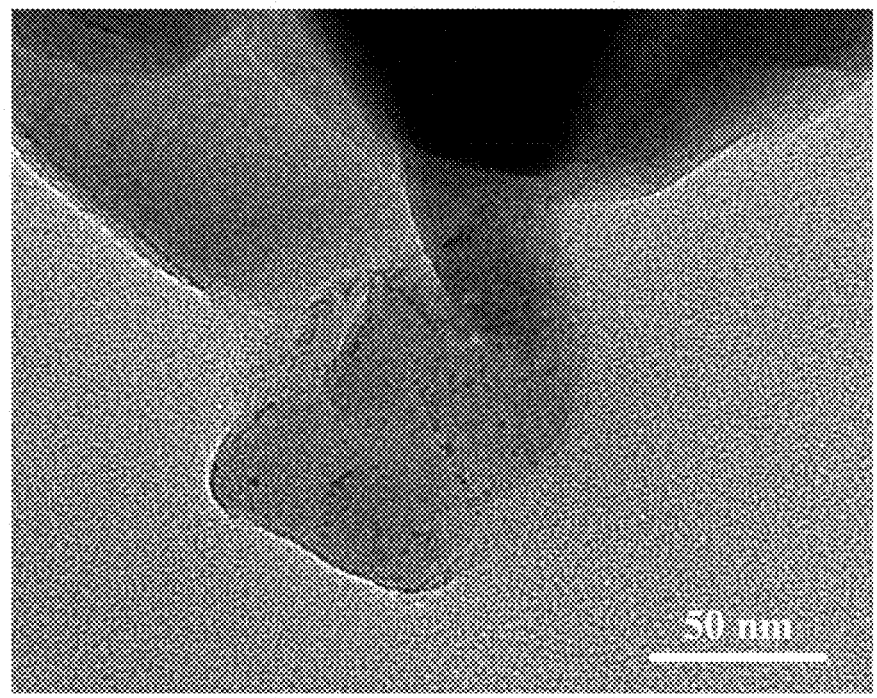
FIG. 18 An electron micrograph (TEM micrograph) of the metallic nanoparticle composite of EXAMPLE 3.
Figure 19:
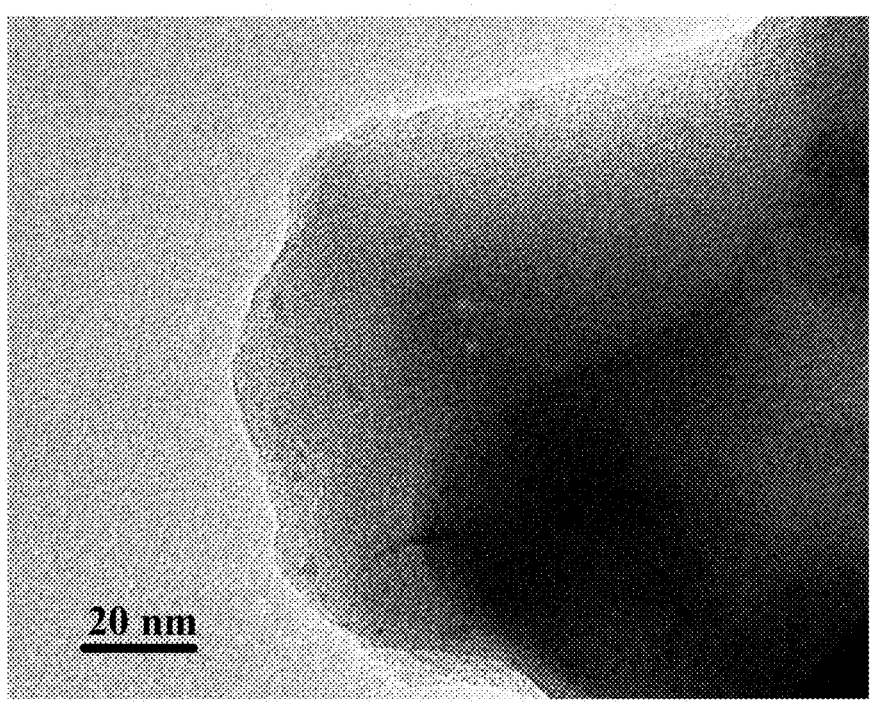
FIG. 19 An electron micrograph (TEM micrograph) of the metallic nanoparticle composite of EXAMPLE 3.

Subsequently, the cobalt nanoparticle composite that was obtained by the method of this example was observed through a transmission electron microscope with an acceleration voltage of 200 kV (JEM-2010, which is the name of a product manufactured by JEOL, Ltd.). Electron micrographs (i.e., a TEM micrograph) thus shot are shown in FIGS. 17 to 19.

Figure 17:
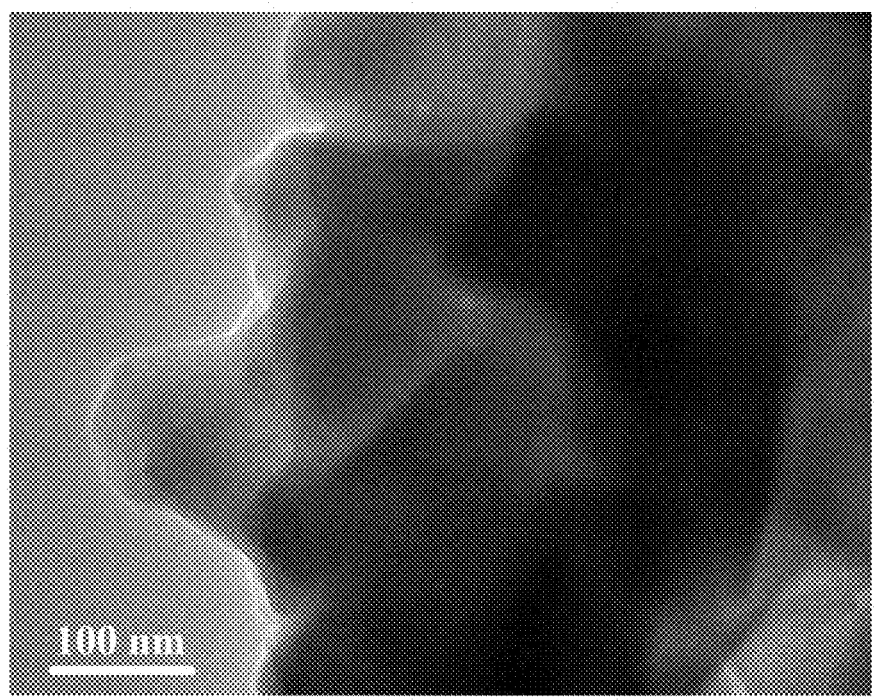
FIG. 17 An electron micrograph (TEM micrograph) of a metallic nanoparticle composite according to EXAMPLE 3.

As can be seen from FIG. 17, no excessively grown particles had been formed after the reduction. Also, as shown in FIGS. 18 and 19, the cobalt nanoparticles were uniformly dispersed in the zeolite and had a particle size of 5 nm or less.

As can be seen from the foregoing description, the present invention is useful as a method for producing a metallic nanoparticle composite in which metallic nanoparticles are dispersed and which is usable as a catalyst, for example, and as a metallic nanoparticle composite produced by such a method.

The invention claimed is:

1. A method for producing a metallic nanoparticle composite in which metallic nanoparticles are loaded into pores of a porous medium, the method comprising at least:
    an adsorbing step to cause an organometallic complex to be adsorbed into the pores of the porous medium;
    a decomposing step to decompose the organic compound of the organometallic complex that has been adsorbed into the pores of the porous medium by irradiating the porous medium, which has adsorbed the organometallic complex in its pores, with an ultraviolet ray; and
    a consolidated decomposing and reducing step to decompose an organic compound of the organometallic complex that has been adsorbed into the pores of the porous medium by subjecting the porous medium, which has adsorbed the organometallic complex in its pores, to a heating treatment within a reducing atmosphere, and to reduce metal cations in the organometallic complex to load the metallic nanoparticles into the pores of the porous medium,
    wherein in the consolidated decomposing and reducing step, the heating treatment is conducted at a temperature of 300° C. to 500° C.,
    wherein the porous medium is at least one selected from the group consisting of: zeolite, porous silica, porous alumina, porous carbon, and metal-organic framework (MOF), and
    wherein the pores have a mean pore size of 5 nm or less.

2. The method of claim 1, wherein in the decomposing step, the ultraviolet ray has an illuminance of 1 to 1000 mW/cm$^2$ at a wavelength of 360 nm.

3. The method of claim 1, wherein the adsorbing step has a process time of 1 to 24 hours.

4. The method of claim 1, wherein, in the consolidated decomposing and reducing step, the heating treatment is conducted for a duration of 0.5 to 2 hours.

5. The method of claim 1, wherein a constituent metal of the metallic nanoparticles is at least one metal selected from the group consisting of: titanium, vanadium, manganese, iron, cobalt, and nickel.

6. The method of claim 1, wherein the metallic nanoparticles have a mean particle size of 1 to 5 nm.

* * * * *